(12) United States Patent
Zukoshi

(10) Patent No.: US 12,187,240 B2
(45) Date of Patent: Jan. 7, 2025

(54) WIPER BLADE

(71) Applicant: THE MITA COMPANY, LTD, Tokyo (JP)

(72) Inventor: Masato Zukoshi, Kanagawa (JP)

(73) Assignee: THE MITA COMPANY, LTD (JP)

(*) Notice: Subject to any disclaimer, the term of this patent is extended or adjusted under 35 U.S.C. 154(b) by 0 days.

(21) Appl. No.: 17/919,738

(22) PCT Filed: Apr. 8, 2022

(86) PCT No.: PCT/JP2022/017382
§ 371 (c)(1),
(2) Date: Oct. 18, 2022

(87) PCT Pub. No.: WO2023/195168
PCT Pub. Date: Oct. 12, 2023

(65) Prior Publication Data
US 2024/0246515 A1    Jul. 25, 2024

(51) Int. Cl.
*B60S 1/38*    (2006.01)
(52) U.S. Cl.
CPC .............. *B60S 1/38* (2013.01); *B60S 1/381* (2013.01); *B60S 1/3874* (2013.01);
(Continued)
(58) Field of Classification Search
CPC .. B60S 1/38; B60S 1/524; B60S 1/542; B60S 1/546; B60S 2001/3836; B60S 1/3874;
(Continued)

(56) References Cited

U.S. PATENT DOCUMENTS 3,566,432 A * 3/1971 Quinlan et al. ............ B60S 1/38
                                                             15/250.41
4,513,468 A    4/1985 Hayden
(Continued)

FOREIGN PATENT DOCUMENTS

DE          DD294667        * 10/1991
DE       19935859 A1      2/2003
(Continued)

OTHER PUBLICATIONS

English language Abstract of German publication DD294667, published Oct. 1991. (Year: 1991).*
(Continued)

*Primary Examiner* — Gary K. Graham
(74) *Attorney, Agent, or Firm* — Harvey S. Kauget; Burr & Forman LLP

(57) ABSTRACT

In a cross-sectional structure of an existing blade rubber having a non-hollow cross-section, only elasticity of a material of the blade rubber is used for pressure to wipe a windshield. Therefore, it is difficult for the blade rubber to flexibly follow change of a surface shape of the windshield, and sufficient wiping performance is not obtainable. A blade rubber to be attached to a frame of a vehicle wiper and to wipe the windshield according to the present invention includes a wing portion extending in a lateral direction to fix the blade rubber to the frame, a neck portion perpendicularly coupled to the wing portion, a deformation portion elastically deformable and coupled to a lower side of the neck portion, and a contact portion provided on a side of the deformation portion opposite to a side provided with the neck portion, and configured to abut on the windshield. The deformation portion internally includes a cavity portion having a heart-shaped cross-section. The neck portion is coupled to an upper intersection of two curved portions surrounded by an outside of the deformation portion and the (Continued)

heart-shaped cavity. The contact portion is coupled to a lower intersection.

2 Claims, 3 Drawing Sheets

(52) U.S. Cl.
CPC ............ *B60S 1/3881* (2013.01); *B60S 1/3882* (2013.01); *B60S 2001/3836* (2013.01)

(58) Field of Classification Search
CPC ...... B60S 1/3881; B60S 1/3882; B60S 1/381; A47L 1/06; A47L 13/11
USPC .................................. 15/245, 250.04, 250.48
See application file for complete search history.

(56) References Cited

U.S. PATENT DOCUMENTS

| | | | |
|---|---|---|---|
| 4,524,481 | A | 6/1985 | Koomen |
| 2010/0186186 | A1* | 7/2010 | Boland ................... B60S 1/381 |
| | | | 15/250.48 |

FOREIGN PATENT DOCUMENTS

| | | | |
|---|---|---|---|
| DE | 19745686 | * | 8/2007 |
| DE | 102018251739 | * | 7/2020 |
| EP | 2008891 A1 | | 10/2013 |
| FR | 2846927 | | 5/2004 |
| GB | 2069326 | | 8/1981 |
| JP | U-S61-76754 | | 5/1986 |
| JP | U-S61-203155 | | 12/1986 |
| JP | Y2-H1-34910 | | 10/1989 |
| JP | H07303589 | | 11/1995 |
| JP | A-H11-11261 | | 1/1999 |
| JP | A-2001-80472 | | 3/2001 |
| JP | 2003506243 | | 2/2003 |
| JP | B-5331109 | | 10/2013 |
| KR | 101234714 | | 2/2013 |
| WO | WO2006/088274 | * | 8/2006 |
| WO | WO3009/007647 | * | 1/2009 |

OTHER PUBLICATIONS

English translation of description portion of French publication 2846927, published May 2004. (Year: 2004).*
Office Action issued on Oct. 31, 2022 in a corresponding foreign application.
International Search Report—Jun. 21, 2022.

* cited by examiner (A)  (B)

WIPER BLADE

TECHNICAL FIELD

The present invention relates to a structure of a wiper blade of a wiper for wiping the windshield of a vehicle.

BACKGROUND OF THE INVENTION

A vehicle wiper mainly includes a supporting body (vertebra) to which a wiper arm for causing a wiper to perform reciprocating arc motion is coupled, and a blade rubber that is held entirely by the supporting body and comes into direct contact with and wipes off rain drops and dust attached to a windshield. To uniformly wipe off the rain drops and the dust, it is necessary for the blade rubber to constantly press the surface of the windshield with uniform force. However, it is difficult for the blade rubber to constantly uniformly press a curved surface of the windshield that changes with the arc motion of the wiper. To obtain sufficient pressing force, it is necessary to increase force of the wiper arm applied to the vertebra. This leads to a problem that the blade rubber is nonuniformly worn out and deteriorated to reduce the service life of the blade rubber. Therefore, to obtain uniform pressing force to the surface of the windshield without increasing the force of the wiper arm, blade rubbers having various cross-sectional structures have been devised.

A cross-sectional structure of a normal blade rubber mainly includes a tip portion that has a thin width and abuts on the surface of the windshield, a fixing portion that includes a protrusion to attach the blade rubber to the vertebra, and an intermediate portion to cause the blade rubber to have elasticity in a vertical direction and a lateral direction. The intermediate portion that has an inverted-triangular cross-section and is hollow or not hollow, is common (Patent Literatures 1 to 5); however, various intermediate portions each having another shape have been proposed (Patent Literatures 6 and 7).

CITATION LIST OF PATENT LITERATURE

PATENT LITERATURE 1: JP-A-2001-80472
PATENT LITERATURE 2: JP-U-S61-76754
PATENT LITERATURE 3: JP-A-H11-11261
PATENT LITERATURE 4: JP-B-5331109
PATENT LITERATURE 5: JP-Y2-H1-34910
PATENT LITERATURE 6: JP-U-S61-203155
PATENT LITERATURE 7: JP-A-2003-506243

SUMMARY OF THE INVENTION

Technical Problem

As described above, it is difficult to constantly apply uniform pressure to the curved surface of the windshield that changes with the reciprocation motion of the wiper, only by pressurization by the wiper arm. In particular, in a cross-sectional structure of a blade rubber, the cross-section of which is not hollow, only elasticity of a material of the linear blade rubber is used as pressure to wipe the windshield. Therefore, it is difficult to flexibly follow the change of the surface shape of the windshield, and sufficient wiping performance is not obtainable.

Solution to the Problem

In a structure of a wiper blade according to the present invention, when a frame side is assumed to be an upper side, a neck portion extends in a vertical direction at center, a wing portion extending in a horizontal direction is provided on both sides of an uppermost part of the neck portion for fixation to the frame, and the neck portion extends downward and is coupled to a hollow deformation portion. The cross-sectional shape of the hollow portion is a heart shape with the neck portion as a center line. As a result, the cross-section of the deformation portion has symmetrical curved sides with the neck portion as the center line. The neck portion is coupled to an upper intersection of the curved portions, and a contact portion wiping the windshield extends downward from a lower intersection of the curved portions.

A blade rubber according to the present invention is configured as follows.

A blade rubber to be attached to a frame of a vehicle wiper and to wipe a windshield, includes: a wing portion extending in a horizontal direction to fix the blade rubber to the frame; a neck portion perpendicularly coupled to the wing portion; a deformation portion elastically deformable and coupled to a lower end of the neck portion; and a contact portion provided on a side of the deformation portion opposite to a side provided with the neck portion, and configured to abut on the windshield. The deformation portion internally includes a cavity portion having a heart-shaped cross-section. The neck portion is coupled to an intersection of arc parts of two curved portions surrounded by an outside of the deformation portion and the heart-shaped cavity portion. The contact portion is coupled to an intersection at which the curved portions are coupled at an acute angle.

Further, each of the two curved portions is less in thickness than the neck portion and the contact portion.

Further, the wing portion includes a first wing portion to be inserted into a holding groove of the frame, and a second wing portion abutting on a bottom surface of the frame to fix the blade rubber. A clearance is provided between upper surfaces of the arc parts of the two curved portions in the heart shape and the second wing portion.

Advantageous Effects of the Invention

With the cross-sectional structure according to the present invention, the curved portions of the deformation portion having the heart-shaped cavity are deformed and crushed in the vertical direction and the lateral direction. As a result, restoring force greater than restoring force by the existing technique occurs. Further, by the action of the deformation portion, the blade is deformed by flexibly following the change of the curved surface of the windshield with the motion of the wiper. This makes it possible to wipe the windshield with more uniform pressing force. Accordingly, as compared with the existing blade rubber, it is possible to largely improve the wiping performance.

DETAILED DESCRIPTION OF THE INVENTION

An embodiment of the present invention is described in detail below by using an example.

Figure 1:
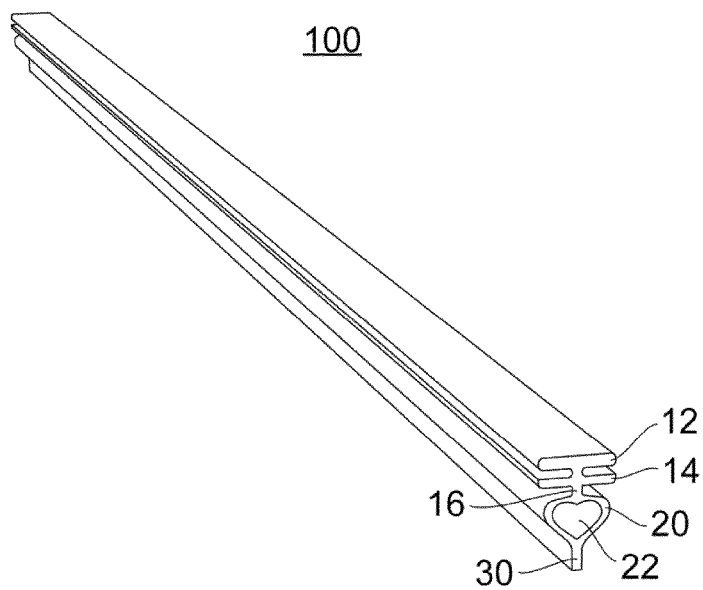
FIG. 1 is an appearance perspective view of a blade rubber according to the present invention.
Figure 2:
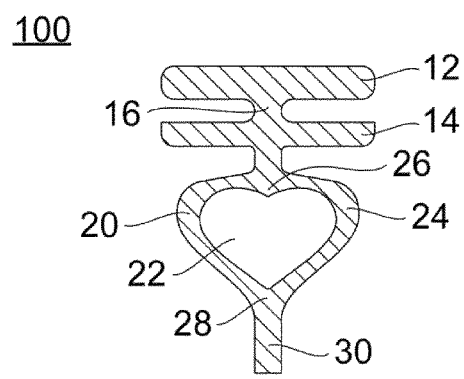
FIG. 2 is a vertical cross-sectional view of the blade rubber according to the present invention.

FIG. 1 illustrates the appearance of the whole of a blade rubber according to the present invention. The blade rubber is fabricated by molding natural rubber, chloroprene rubber, silicon rubber, or the like. The blade rubber has the same cross-sectional shape in a longitudinal direction. FIG. 2 is a vertical cross-sectional view of the blade rubber according to the present invention. In a cross-sectional structure of the blade rubber according to the present invention, when the side of the blade rubber held by a frame is assumed to be an upper side, a neck portion 16 extends in a vertical direction at center, and a first wing portion 12 and a second wing portion 14 provided to be fixed to a wiper 1 (FIG. 3) extend in a horizontal direction on both sides of the upper part of the neck portion 16. The uppermost first wing portion 12 is held by a frame 3 by being inserted into a holding groove 4 of the frame 3. The neck portion 16 forms a core of the blade rubber, perpendicularly extends downward to intersect with the second wing portion 14, and is connected to a deformation portion 20.

The deformation portion 20 internally includes a cavity portion 22 having a heart-shaped cross-section. As a result, an outside of the deformation portion 20 is formed by two curved portions 24, and the neck portion 16 is coupled to an upper intersection 26 that is an intersection of upper arc parts of the two curved portions 24. Further, a contact portion 30 abutting on a windshield extends downward from a lower intersection 28 at which the heart shape is coupled at an acute angle, at the lower end of the deformation portion 20. The heart shape has characteristics that both sides are formed by curved lines symmetrical about the center line, the upper part has an arc shape, the upper intersection 26 of the curved lines is recessed downward, and the lower intersection 28 protrudes downward. As described below, the shape exerts a large effect in improving its wiping performance.

Figure 3:
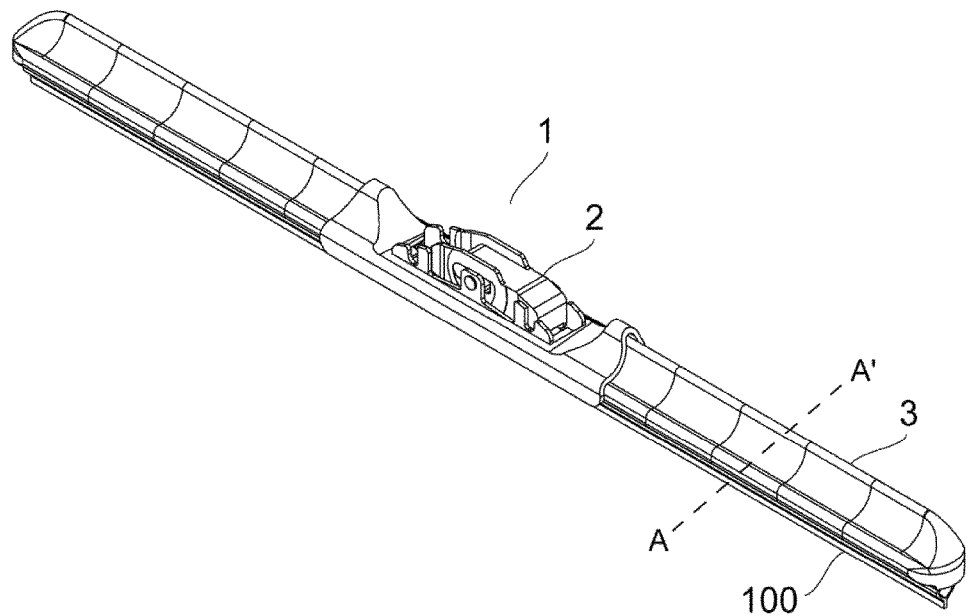
FIG. 3 is an appearance perspective view in a state where the blade rubber according to the present invention is attached to a flat wiper.
Figure 4:
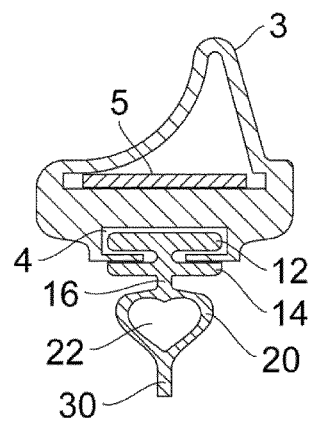
FIG. 4 is a cross-sectional view taken along line A-A' in FIG. 3 in the state where the blade rubber according to the present invention is attached to the flat wiper.

FIG. 3 is an appearance perspective view in the state where the blade rubber 100 according to the present invention is attached to the wiper 1. FIG. 4 is a cross-sectional view taken along line A-A' in FIG. 3. The wiper 1 includes a clip portion 2 to be coupled to a wiper arm (not illustrated), at a center part, and the frame 3 holding the blade rubber 100 on both sides of the clip portion 2. A plate spring 5 passes through the center part of the cross-section of the entire frame 3 in the longitudinal direction of the frame, and applies force to uniformly press the wiper 1 against the windshield. The blade rubber 100 is firmly fixed to the frame 3 because the first wing portion 12 is inserted into the holding groove 4 of the frame 3 in the longitudinal direction and the second wing portion 14 abuts on the bottom surface of the frame 3 at that time.

Figure 5:
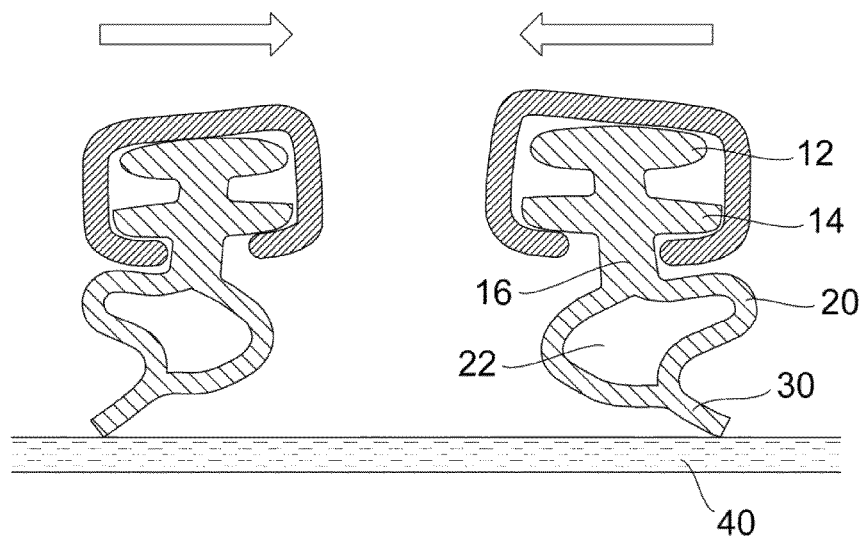
FIG. 5 is a diagram illustrating a state of a cross-section in a case where the blade rubber according to the present invention is moved right and left.

FIG. 5 is a diagram obtained by photographing a cross-sectional state in a case where the wiper blade 100 according to the present invention is moved right and left on a flat glass 40 on a trial basis, and tracing a photograph. In this example, the first wing portion 12 and the second wing portion 14 are collectively held and fixed by a supporting body of a test device. Each of arrows at the upper end in FIG. 5 indicates a moving direction of the wiper, and the position of the glass is schematically illustrated at the lower end. As can be seen from FIG. 5, the curved portions 24 of the deformation portion 20 are asymmetrically deformed when the wiper is moved. In other words, the curved portion 24 on a side opposite to the traveling direction side is largely contracted and deformed relative to the center of the deformation portion 20, whereas the curved portion 24 on the traveling direction side is pulled to the side opposite to the traveling direction and is slightly deformed. As a result of asymmetrical deformation of the deformation portion 20 in the above-described manner, the contact portion 30 is largely inclined.

Figure 6:
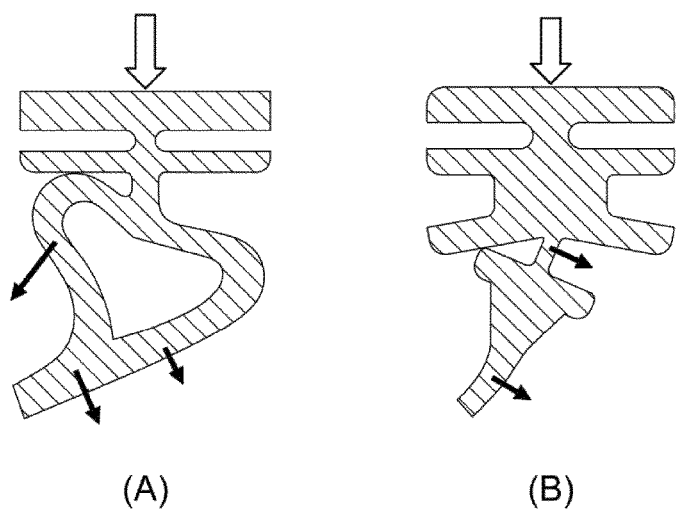
FIG. 6 is a diagram to explain external force applied to the blade rubber (A) according to the present invention and an existing blade rubber (B), and restoring force of each of the rubbers.

FIG. 6 is a diagram illustrating cross-sectional states in a case where the blade rubber (A) having the structure according to the present invention and a blade rubber having an exemplary existing structure (B) (Patent Literature 4) are moved rightward. Each of the blank arrows indicates external force applied from the wiper arm to the blade rubber, and each of the black arrows indicates restoring force by elasticity of the rubber deformed by the external force and lateral motion. In the case of the blade rubber having the heart-shaped hollow structure according to the present invention, it is possible to largely incline the contact portion 30.

The blade rubber having the structure according to the present invention is characterized in that large asymmetrical deformation is possible relative to the center line of the heart shape. This is because the curved portions 24 on both sides of the heart shape and the neck portion 16 are coupled at the upper intersection 26, and a thickness of the neck portion 16 is greater than a thickness of most part of the curved portions 24, which causes the curved portions 24 to be deformed easier than the neck portion 16. In other words, by the external force of the wiper arm and the force in the direction opposite to the traveling direction, received from the windshield caused by the lateral motion, the curved portion 24 on the side opposite to the traveling direction side is deformed before the neck portion 16, to incline the whole of the deformation portion 20. As a result, the contact portion 30 is also inclined. When the inclination of the contact portion 30 is further increased, the upper surface of the largely deformed curved portion 24 abuts on a bottom surface of the second wing portion 14, and the curved portion 24 is further crushed and deformed because the curved portion 24 cannot move upward any more. When the deformation is increased, the restoring force by the elasticity of the rubber at a drastically deformed portion is increased, and a downward component thereof acts as force pressing the contact portion 30 downward. In addition, the curved portion 24 on the traveling direction side is also deformed and the restoring force by the elasticity of the rubber is generated, and the downward component thereof contributes to force pressing the contact portion 30 downward. Further, the restoring force by the elastic deformation of the contact portion 30 is added with the restoring force of the curved portions 24 on both sides of the deformation portion 20, and large downward pressing force to the windshield is accordingly given to the tip of the contact portion 30.

In contrast, in the case of the blade rubber having the existing structure without a cavity portion, the intermediate portion having a substantially triangular cross-section is hardly elastically deformed because the intermediate portion is greater in thickness than the neck portion and the contact portion, and elastic deformation mainly occurs on the neck portion and the contact portion. The restoring force by elasticity of the neck portion and the contact portion is obviously less than the restoring force according to the present invention including the curved portions 24.

The magnitude of the pressing force of the blade rubber according to the present invention depends on a width of the upper intersection 26, an interval between the upper surfaces of the arc parts and the second wing portion 14, and the thicknesses of the curved portions 24 (namely, size of cavity portion 22). Therefore, these parameters are determined so as to obtain desired pressing force. Note that, in the present embodiment, the cavity portion 22 having the symmetrical heart shape is described; however, the heart shape may not be symmetrical as long as the heart shape has the curved portions easily deformed right and left.

Further, the deformation portion 20 having the heart-shaped cavity portion 22 can be flexibly deformed in both of the lateral direction and the vertical direction because both sides of the center line can be deformed to different shapes. The deformation portion 20 can react to changes of the curved surface of the windshield with the reciprocation motion of the wiper, like a shock absorber, and can follow large changes. In contrast, in the case of the blade rubber not having the cavity portion as illustrated in FIG. 6(B), the blade rubber is not deformed in the vertical direction in response to changes, and reaction to the changes is mainly by the inclination in the lateral direction of the neck portion and the contact portion. Therefore, when the changes are large, the blade rubber cannot sufficiently follow them. Further, the heart-shaped cavity portion according to the present invention has the curved portions in a ratio greater than any of the existing blade rubbers (for example, Patent Literatures 1 to 3) each having a cavity portion formed in another shape. Therefore, as described above, the blade rubber according to the present invention is flexible and largely deformable as compared with the existing blade rubbers, which makes it possible to further improve the uniformity of wiping.

Note that the present invention is described based on the above-described embodiment; however, the present invention is not limited to the embodiment, and it is apparent to those skilled in the art that various modifications and corrections can be made within the spirit of the present invention and the scope of the appended claims. In the above-described embodiment, the cavity is empty (air). Alternatively, for example, as an additional function, a liquid agent such as a water repellent agent may be injected into the cavity so as to seep from the cavity, thereby imparting water repellency to the windshield. Further alternatively, the size of the cavity portion may be increased or decreased depending on the position of the blade rubber in the longitudinal direction, and elasticity may be varied depending on the position.

REFERENCE SIGNS LIST

1 Wiper
2 Clip portion
3 Frame
4 Holding groove
100 Blade rubber according to the present invention
12 First wing portion
14 Second wing portion
16 Neck portion
20 Deformation portion
22 Cavity portion
24 Curved portion
26 Upper intersection
28 Lower intersection
30 Contact portion
40 Glass

What is claimed is:

1. A wiper blade comprising:
a first wing portion extending in a horizontal direction to be inserted into a holding groove of a frame of a vehicle to fix a blade rubber to the frame of the vehicle;
a second wing portion abutting on a bottom surface of the frame of the vehicle to fix the blade rubber to the frame of the vehicle;
a neck portion perpendicularly coupled to the first wing portion and the second wing portion;
a deformation portion elastically deformable and coupled to a lower end of the neck portion;
a contact portion provided on a side of the deformation portion opposite to a side provided with the neck portion, and configured to abut on a windshield of the vehicle;
wherein the deformation portion internally includes a cavity portion having a heart-shaped cross-section;
the neck portion is coupled to an intersection of arc parts of two curved portions surrounded by an outside of the deformation portion and the heart-shaped cavity portion, and the contact portion is coupled to an intersection at which the curved portions are coupled at an acute angle; and
a clearance is provided between upper surfaces of the arc parts of the two curved portions and the second wing portion.

2. The wiper blade according to claim 1, wherein each of the two curved portions is less in thickness than the neck portion and the contact portion.

* * * * *